(12) United States Patent
McCarty, Jr.

(10) Patent No.: US 7,349,487 B2
(45) Date of Patent: *Mar. 25, 2008

(54) NYQUIST FILTER AND METHOD

(75) Inventor: Robert Joseph McCarty, Jr., Rockwall, TX (US)

(73) Assignee: Soar S.K., Limited Liability Company, Wilmington, DE (US)

( * ) Notice: Subject to any disclaimer, the term of this patent is extended or adjusted under 35 U.S.C. 154(b) by 650 days.

This patent is subject to a terminal disclaimer.

(21) Appl. No.: 10/657,904

(22) Filed: Sep. 9, 2003

(65) Prior Publication Data

US 2004/0047430 A1    Mar. 11, 2004

Related U.S. Application Data

(63) Continuation of application No. 09/302,078, filed on Apr. 28, 1999, now Pat. No. 6,628,728.

(51) Int. Cl.
*H04L 23/02* (2006.01)
*H04B 1/10* (2006.01)

(52) U.S. Cl. ..................... 375/261; 375/350

(58) Field of Classification Search ............... 375/296, 375/261, 233, 232, 348, 350; 370/509
See application file for complete search history.

(56) References Cited

U.S. PATENT DOCUMENTS

| | | | |
|---|---|---|---|
| 4,339,724 A | 7/1982 | Feher | |
| 4,567,602 A | 1/1986 | Kato et al. | |
| 4,843,615 A | 6/1989 | Davis | |
| 4,879,745 A | 11/1989 | Arbel | |
| 5,253,271 A | 10/1993 | Montgomery | |
| 5,309,482 A | 5/1994 | Wright et al. | |
| 5,357,502 A | 10/1994 | Castelain et al. | |
| 5,487,089 A | 1/1996 | Misaizu et al. | |
| 5,648,923 A | 7/1997 | Lane et al. | |
| 5,774,506 A | 6/1998 | Futagi | |
| 5,787,079 A | 7/1998 | Bateman et al. | |
| 5,796,782 A | 8/1998 | Sagawa | |
| 5,834,986 A | 11/1998 | Myers | |

(Continued)

FOREIGN PATENT DOCUMENTS

EP    0441732 A    2/1991

(Continued)

OTHER PUBLICATIONS

Kabal et al.; "Generalized Raised-Cosine Filters"; IEEE Transcations on Communications; vol. 47, No. 7; Jul. 1999; pp. 989-997.*

(Continued)

*Primary Examiner*—Don N. Vo
(74) *Attorney, Agent, or Firm*—Connolly Bove Lodge & Hutz LLP

(57) ABSTRACT

An improved Nyquist filter can be used as a matched filter in a digital communications system. This filter is characterized in that the frequency domain response meets the Nyquist criteria and that the square root of the frequency domain response has a first derivative that is continuous at all points. In other embodiments, the square root of the frequency domain response continuous over all points for all higher order derivatives.

16 Claims, 8 Drawing Sheets

U.S. PATENT DOCUMENTS

| | | | |
|---|---|---|---|
| 5,930,267 A * | 7/1999 | Daneshrad et al. | 370/509 |
| 6,047,025 A | 4/2000 | Johnson et al. | |
| 6,144,697 A * | 11/2000 | Gelfand et al. | 375/233 |
| 6,175,599 B1 * | 1/2001 | Lyon et al. | 375/261 |
| 6,252,910 B1 * | 6/2001 | West et al. | 375/261 |
| 6,628,728 B1 * | 9/2003 | McCarty, Jr. | 375/296 |
| 7,027,498 B2 * | 4/2006 | McCarty, Jr. | 375/232 |

FOREIGN PATENT DOCUMENTS

| | | |
|---|---|---|
| EP | 0587129 | 9/1993 |
| WO | WO 98/43349 | 1/1998 |

OTHER PUBLICATIONS

EE 379A—Digital Communication: Signal Processing, Winter Quarter 1998-1999, internet (http://www.standford.edu/class/ee379a/welcome.html); pp. 153-157.

Modern Quadrature Amplitude Modulation, Principles and Applications for Fixed and Wireless Communications; (Chapter 3) "Introduction to Modems," Pentech Press Limited, 1994, pp. 80-115.

* cited by examiner

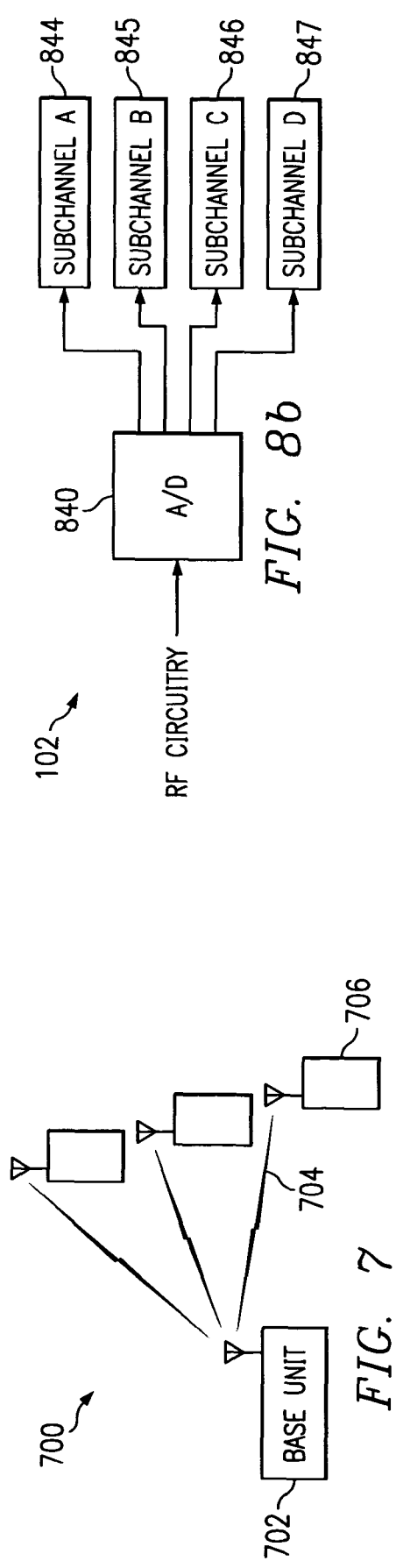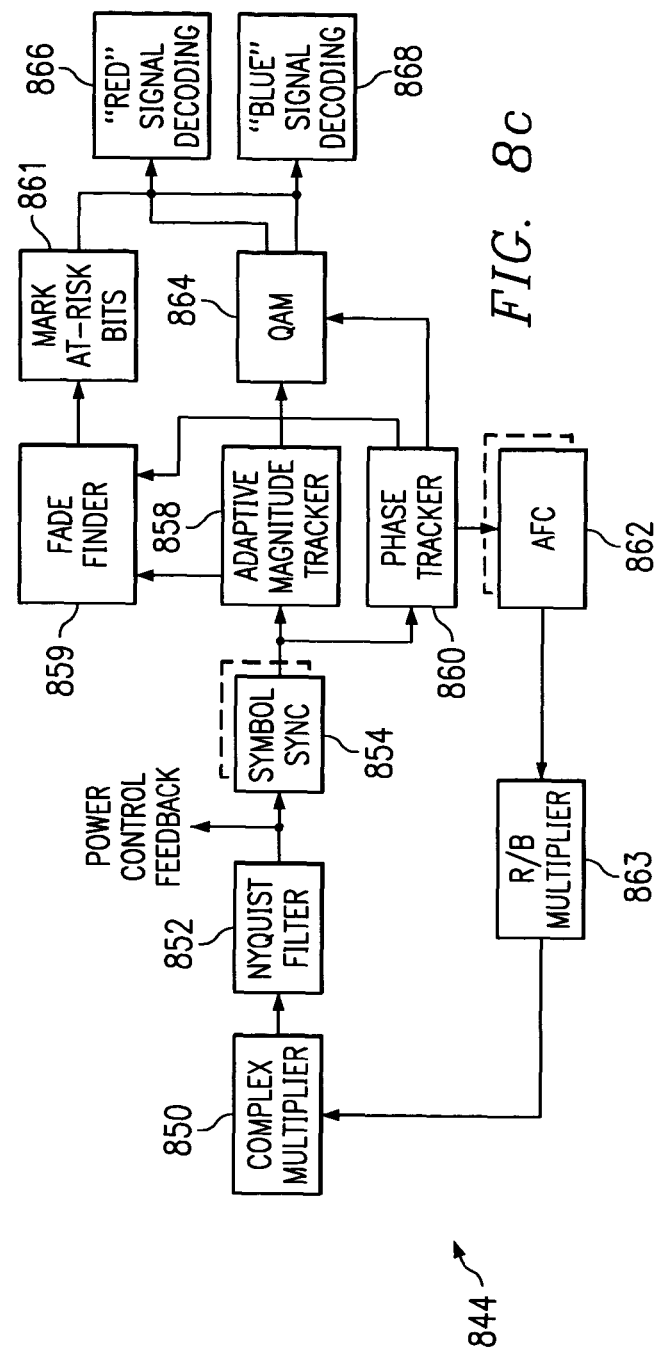

NYQUIST FILTER AND METHOD

This application is a continuation of patent application Ser. No. 09/302,078, entitled "Nyquist Filter and Method," filed on Apr. 28, 1999, now U.S. Pat. No. 6,628,728 which application is incorporated herein by reference.

FIELD OF THE INVENTION

The present invention relates generally to filter circuits and more particularly to an improved Nyquist filter and method.

BACKGROUND OF THE INVENTION

The present invention relates to filters such as the kind that can be utilized in communications systems. FIG. 1 illustrates a basic block diagram of a digital communication system that utilizes pulse amplitude modulation. In this system, a pulse generator 12 receives clock pulses and binary input data. The output of pulse generator 12 will be a digital binary stream of pulses.

The pulse stream from pulse generator 12 is applied to the digital transmitting filter 14 that shapes the pulse for output to the digital-to-analog converter 15 and transmission over channel 16. Channel 16 may be a wired or wireless channel depending upon the application. The transmitted data is received at receiving filter 18. The output of filter 18 is applied to analog-to-digital converter 20. Analog-to-digital converter 20 utilizes clock pulses that are generally recovered from the transmitted data by clock recovery circuit 22. The output binary data from analog-to-digital converter 20 is a replica of the input binary stream that was provided to pulse generator 12.

Major objectives of the design of the baseband PAM system are to choose the transmitting and receiving filters 14 and 18 to minimize the effects of noise, to eliminate or minimize inter-symbol interference (ISI) and to reduce stop band energy. Inter-symbol interference can be theoretically eliminated by properly shaping the pulses of the transmitted signal. This pulse shaping can be accomplished by causing the pulse to have a zero value at periodic intervals.

Modern embodiments of pulse shaping filters use a pair of matched filters, one for transmit and one for receive. The convolution of the transmit filter with the receive filter forms the complete pulse shaping filter. Inter-symbol interference is avoided since the combined filter impulse response reaches unity at a single point and is zero periodically at every other information point (Nyquist sampling rate). The linear superposition of pulses representing a pulse train preserves bandwidth and information content. Linear superposition of band limited pulses remains band limited and sampling the combined filter at the information rate recovers the information.

FIG. 3b shows an example of a Nyquist filter impulse response. Zeros occur at the information rate, except at one information bearing point. All Nyquist filters having the same stop band are equally bandwidth limited if the time response of the filters is allowed to go to infinity. Realizable filters, however, are truncated in time since it is not possible to have an infinitely long time function. Truncation error in the time domain causes the theoretical stop band achievable by all Nyquist filters to be violated, so that out of band energy exists in excess of the stop band frequency.

The most bandwidth efficient filter is the "brick wall" filter illustrated in FIG. 3a by the box ($\alpha$=0). The time response of this filter is shown in FIG. 3b ($\alpha$=0). While bandwidth efficiency is theoretically greatest for a brick wall filter as the time response approaches infinity, truncation error causes poor performance for practical and realizable approximations to the brick wall filter.

One method of producing practical filters is to allow the stop band of Nyquist compliant filters to exceed the bandwidth of the ideal brick wall filter and smoothly transition to the stop band. A class of such filters is the raised cosine filters. In the frequency domain (FIG. 3a), the raised cosine filter smoothly approaches the frequency stop band (except for the limiting brick wall filter case). The raised cosine filter is continuous at the stop band and the first derivative is continuous. The second derivative of a raised cosine filter, however, is not continuous at the stop band.

In current embodiments of most systems, the raised cosine filter is used in its matched filter version. The transmit square root raised cosine filter, which determines the spectral bandwidth efficiency of the system, is discontinuous in the first derivative at the stop band.

SUMMARY OF THE INVENTION

The preferred embodiment of the present invention utilizes a pulse shaping filter that meets the Nyquist criteria. This filter also has the property of being continuous in the frequency domain up to and including the first derivative for the square root matched filter version. Some embodiments of the invention are in fact continuous in all derivatives for the square root version and these filters are closer to the ideal brick wall filter for the same stop band.

Nyquist filters are produced from filters in the frequency domain with a fixed frequency cutoff. As is well known in the state of the art, a fixed cutoff frequency leads to an unrealizable filter of infinite duration in the time domain. To produce a realizable filter, the ideal filter is approximated by time delaying and truncating the infinite impulse response. Truncation, however, produces unintentional out of band energy. One goal that is achieved by some embodiments of the present invention is to minimize this unintentional out of band energy after the filter is truncated.

Embodiments of the present invention provide filters that give a smaller signal ripple at the truncation length for the same theoretical stop band as raised cosine filters and therefore have better attenuation in the frequency domain. Accordingly, the preferred embodiment of the present invention has better truncation performance than the raised cosine that represents state of the art design for identical theoretical stop band.

The present invention includes embodiments that have several advantages over prior art Nyquist filters such as the raised cosine filter. For example, the filter of the preferred embodiment of the present invention reduces the effects of truncation errors, by reducing the energy remaining in the terms beyond the truncation length. This attenuation leads to lower energy levels in the stop bands. For example, one embodiment filter of the present invention has been shown to provide 10 dB improvement in the filter stop band, as compared with a comparable raised cosine filter. In other words, the out-of-band transmissions are reduced by 90%, a significant improvement.

Implementation of embodiments of the present invention in a communication system provides enhanced system performance. Since the out-of-band performance is improved, adjacent channels can be moved closer together and use less frequency guard band. This feature leads to more efficient use of the available bandwidth. This advantage will be similarly be attained for subchannels within a channel.

BRIEF DESCRIPTION OF THE DRAWINGS

The above features of the present invention will be more clearly understood from consideration of the following descriptions in connection with accompanying drawings in which:

FIG. 7 is a generalized diagram of an RF communications system that can utilize the present invention;

FIGS. 8a-8c show an exemplary base station of the system of FIG. 7; and

DETAILED DESCRIPTION

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will first be described with respect to a quadrature amplitude modulation (QAM) system. An improved class of filters will be described with respect to this system. A number of other applications that could also utilize a filter of the present invention are then discussed.

Figure 2:
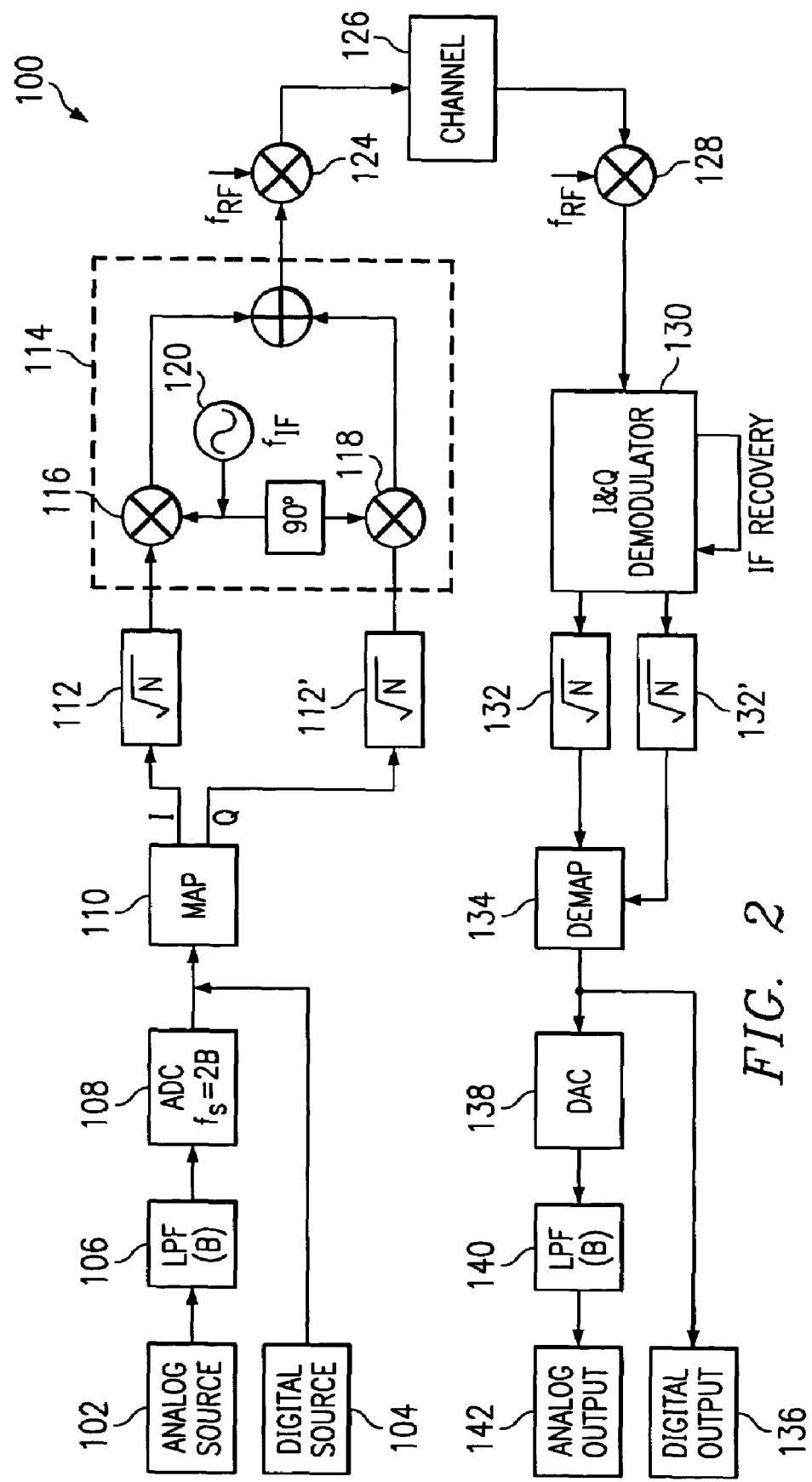
FIG. 2 is a block diagram of a QAM communication system that can utilize the teachings of the present invention.

FIG. 2 illustrates a block diagram of a QAM system 100 that can utilize the filter of the present invention. As shown by blocks 102 and 104, the system can be used for either analog or digital data, or both. If an analog signal, such as voice and/or video as examples, is to be transmitted, it will first be filtered with low pass filter (LPF) 106 and then converted to a digital signal by analog-to-digital converter (ADC) 108. The digital stream, whether from digital source 104, ADC 108, or both, will then be mapped into I (in-phase) and Q (quadrature-phase) carriers in mapping unit 110. Each of these steps is well known in the art and will not be described in detail herein. For more information regarding these blocks, reference can be made to W. T. Webb and L. Hanzo, *Modern Quadrature Amplitude Modulation*, IEEE Press, 1994, chapter 3, pp. 80-93, incorporated herein by reference. FIGS. 2 and 3 were adapted from this text.

The I and Q streams will be filtered in Nyquist filters 112 and 112'. As will be discussed below, the present invention provides a Nyquist filter 112 that has enhanced performance compared to prior art filters. In general, a Nyquist filter has an impulse response with equidistant zero-crossings at symbol points. As a result, the filter eliminates inter-symbol interference (ISI). More detail of the improved Nyquist filter 112 (112') will be provided below.

Once the I and Q signals have been generated and filtered, they are modulated by an I-Q modulator 114. The modulator 114 includes two mixers 116 and 118. As shown, mixer 116 is used for the I channel and mixer 118 is used for the Q channel. The modulator 114 causes both the I and Q channels to be mixed with an intermediate frequency (IF) signal, generated from signal source 120. The I channel will be mixed with a IF signal that is in phase with respect to the carrier and the Q channel will be mixed with an IF signal that is 90 degrees out of phase. This process allows both signals to be transmitted over a single channel within the same bandwidth using quadrature carriers.

The analog signal output from the modulator 114 is then frequency shifted to the carrier frequency by modulator 124. In the preferred embodiment, the carrier frequency is in the radio frequency (RF) range, but other frequencies could be used. The present invention would equally apply to any system that uses CDMA (code division multiple access), TDMA (time division multiple access), optical systems, HDTV (high definition television), cable systems and others.

Returning to FIG. 2, the RF signal is transmitted to the receiver through a channel 126. This channel can be wireless, e.g., RF wireless communications. Alternatively, the channel could be an electrical connection or an optical connection.

A demodulator 128 at the receiver demodulates the received signal by mixing it down to the IF for the I-Q demodulator 130. The I-Q demodulation takes place in the reverse order to the modulation process. The signal is split into two paths, with each path being mixed down with intermediate frequencies that are 90° apart. The two paths are then provided to Nyquist filters 132 and 132', which can be of the type described below.

The output of the Nyquist filters 132 and 132' is provided to a demapping unit 134 which returns the signal to a digital stream. If the original data was digital, then the data from digital source 104 should be recovered at digital output 136. If the original signal was analog, on the other hand, the digital stream from demapping unit 134 would be returned to analog form by digital-to-analog converter (DAC) 138. This analog output of DAC 138 could then be filtered by low pass filter 140 and provided to analog output 142. Once again, reference can be made to the Webb and Hanzo text for additional details on QAM systems.

Figure 1:
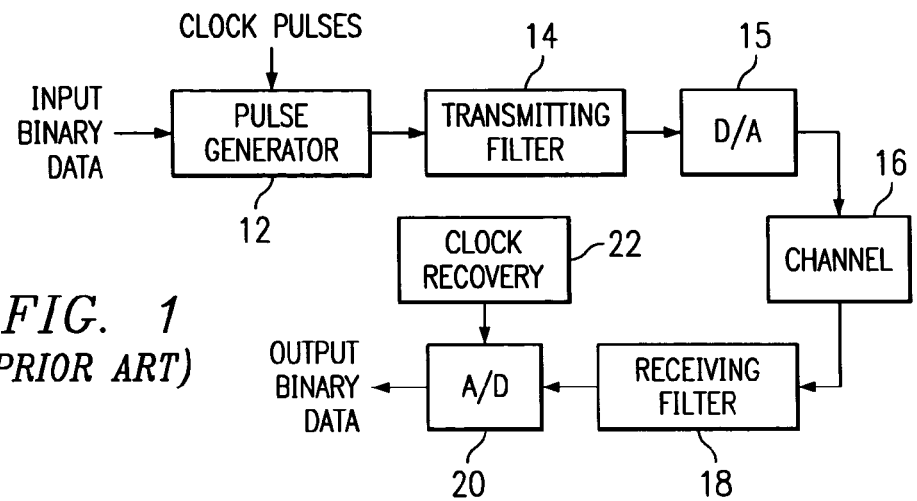
FIG. 1 is a block diagram of a known digital communication system.
Figure 3A:
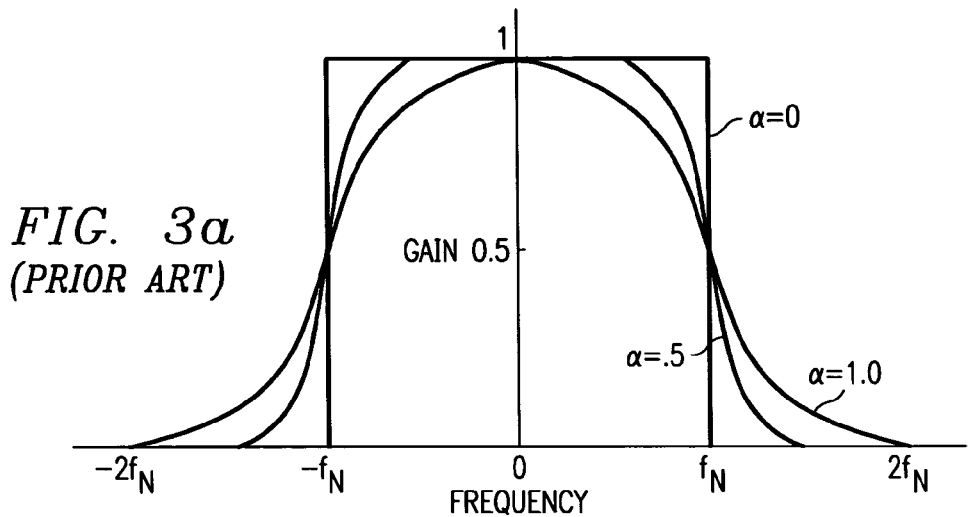
FIGS. 3a and 3b are the frequency and impulse response characteristics of a raised cosine filter.
Figure 3B:
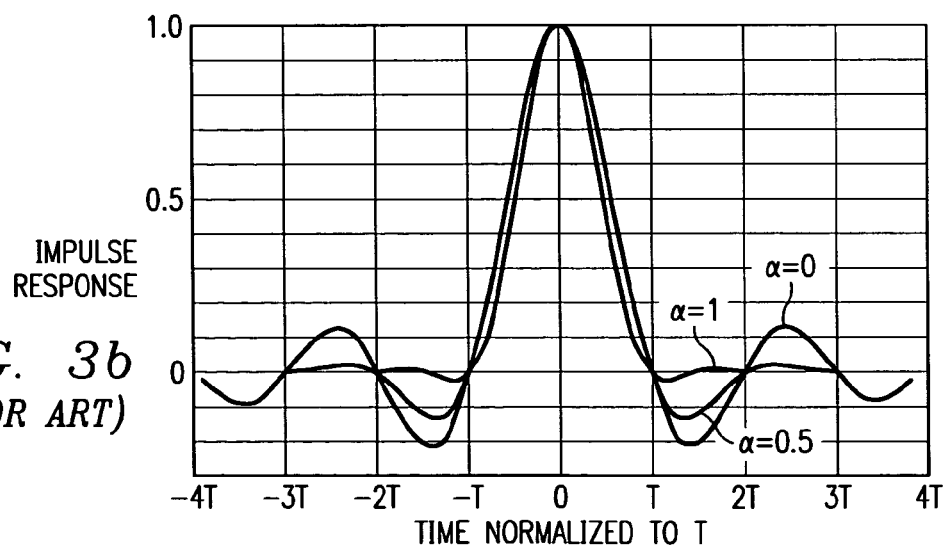

As mentioned above, a Nyquist filter has an impulse response with equidistant zero-crossings at sampling points to eliminate inter-symbol interference (ISI). FIGS. 3a and 3b show the frequency characteristic (FIG. 3a) and impulse response (FIG. 3b) of a well known Nyquist filter, the raised cosine filter. Nyquist showed that any odd-symmetric frequency domain extension characteristic about $f_N$ and $(-f_N)$ yields an impulse response with a unity value at the correct signaling instant and zero crossings at all other sampling instants. The raised cosine characteristic meets these criteria by fitting a quarter period of a frequency-domain cosine shaped curve to an ideal (brick wall) filter characteristic.

The parameter controlling the bandwidth of the raised cosine Nyquist filter is the roll-off factor α. The roll-off factor α is one (α=1) if the ideal low pass filter bandwidth is doubled, that is the stop band goes to zero at twice the bandwidth ($2f_N$) of an ideal brick wall filter at $f_N$. If α=0.5 a total bandwidth of $1.5f_N$ would result, and so on. The lower the value of the roll-off factor α, the more compact the spectrum becomes but the longer time it takes for the impulse response to decay to zero. FIGS. 3a and 3b illustrate three cases, namely when α=0, α=0.5 and α=1.0.

The equation defining the raised cosine filter in the frequency domain ($NF_{Raised\ Cosine}(f)$ where f is frequency) and the corresponding impulse response ($nf_{Raised\ Cosine}(t)$ where t is time) are defined by the following equations.

$$NF_{RaisedCosine}(f) = \begin{cases} T, \text{ for } 0 \leq |f| \leq \frac{1-\alpha}{2T} \\ \frac{T}{2}\left(1 - \sin\left[\frac{\pi T}{\alpha}\left(f - \frac{1}{2t}\right)\right]\right), \text{ for } \frac{1-\alpha}{2T} < |f| \leq \frac{1+\alpha}{2T} \\ 0, \text{ for all other values of } f \end{cases}$$

$$nf_{RaisedCosine}(t) = \frac{\sin\left(\frac{\pi t}{T}\right)}{\frac{\pi t}{T}} \frac{\cos\left(\frac{\alpha \pi t}{T}\right)}{\left(1 - \frac{4\alpha^2 t^2}{T^2}\right)}$$

Matched filters are used in many communication systems in order to maximize the signal-to-noise ratio. As illustrated in FIG. 2, the matched filtering can be accomplished by including Nyquist filters at both the transmitter (filter 112) and the receiver (filter 132). Since two filters are provided, each will have a characteristic of square root of a Nyquist function in the frequency domain. In this manner when the effect of both filters is taken into consideration, the desired Nyquist characteristic will be achieved. In other words, the product in the frequency domain of the two matched filters is equivalent to the frequency domain representation of the Nyquist filter. The following equations provide the frequency domain and impulse response of the square root version of the known raised cosine filter.

$$NF_{Sqrt-RC}(f) = \begin{cases} \sqrt{T}, \text{ for } 0 \leq |f| \leq \frac{1-\alpha}{2T} \\ \sqrt{\frac{T}{2}}\left(1 - \sin\left[\frac{\pi T}{\alpha}\left(f - \frac{1}{2t}\right)\right]\right)^{1/2}, \text{ for } \frac{1-\alpha}{2T} < |f| \leq \frac{1+\alpha}{2T} \\ 0, \text{ for all other values of } f \end{cases}$$

$$nf_{Sqrt-RC}(t) = \frac{4\alpha}{\pi\sqrt{T}} \frac{\left\{\cos\left[(1+\alpha)\frac{\pi t}{T}\right] + \frac{T\sin[(1-\alpha)\pi t/T]}{4\alpha t}\right\}}{\left[1 - \left(4\alpha \frac{t}{T}\right)^2\right]}$$

Figure 4:
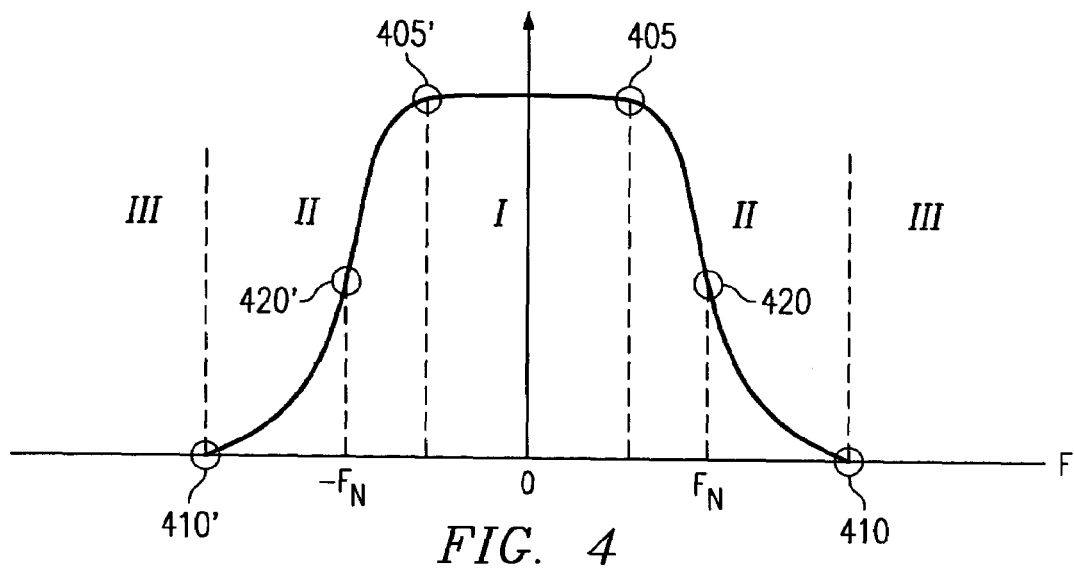
FIG. 4 is a Nyquist filter shown as being represented by three regions.

Spectral efficiency can be gained using filters that are Nyquist compliant and that smoothly transition to the stop band in the frequency domain. FIG. 4 shows three approximate regions of a Nyquist filter in the frequency domain. Region I constitutes the unattenuated passband. Region II represents the transition band and Region III represents the stop band. Filter smoothness can be measured by the number of derivatives with respect to frequency that remain continuous. In particular, for a good filter performance, the filter should be smooth at the point between the transition and stop band regions (II and II) and at the point between the pass band and transition regions (I and II). The square root raised cosine is discontinuous in the first derivative at the point between regions II and III.

The envelop of the time domain response decays more rapidly if the frequency response is smooth, that is continuously differentiable. Unfortunately, the frequency response of a raised cosine filter is non-ideal when the square root is taken. In particular, when the square root of a raised cosine filter is taken, the first derivative is discontinuous at the boundary of regions II and III. As a result, the frequency domain curve does not come in smoothly at the stopband as in the raised cosine case (see FIG. 3a). Instead, the curve comes in sharply to the stopband. A discontinuity in the frequency domain can lead to higher peaking at longer duration in the time domain.

FIG. 4 can be used to illustrate this concept. As discussed above, a Nyquist filter (either of the prior art or of the present invention) is shown as being divided into three regions. Region I is the pass band, region II is the transition band and region III is the stop band. The transition points between regions, labeled 405 and 410, are the points of greatest concern since the functional form of the frequency domain response is defined by different equations at these points. One goal of the preferred embodiment of the present invention is that the filter function be not only continuous but also smooth (i.e., continuous for at least the first derivative) in both the Nyquist filter and square root Nyquist version.

The present invention provides a class of Nyquist filters that have better stop band performance than the known raised cosine filter. The Nyquist filter of the preferred embodiment of the present invention comes in smooth at the stopband when the square root version is used. In other words, the first derivative of this function is continuous. This property allows for truncation at some delay with less energy loss than the known raised cosine.

In the preferred embodiment, an improved class of Nyquist filters will meet two criteria. First, the filter will meet the Nyquist criteria, that is the frequency domain will have odd symmetry about the cutoff frequency ($f_N$). Second, the square root version of the frequency domain of the filter will be continuous at least in the first derivative, preferably at all points. In a subclass of filters of the present invention, all derivatives will be continuous at all points. In typical applications, the higher order derivatives will all be equal to zero at the transition point between regions II and III and between I and II.

A number of filters meet the criteria for the class of filters of the preferred embodiment of the invention. Examples include all Nyquist compliant functions that when differentiated can be written in the form $$F'(\omega) = f'(\omega)\cos\left\{\frac{\pi}{2}\sin\left(\frac{T}{2\alpha}\left(|\omega| - \frac{\pi}{T}\right)\right)\right\}\cos\left[\frac{T}{2\alpha}\left(|\omega| - \frac{\pi}{T}\right)\right]$$

with stop band $\pi/T(1+\alpha)$. Here derivatives to all orders are smooth at the stop band giving zero (using the product rule for differentiation). As will be discussed in further detail below, preferred examples of such functions are composite sine and cosine functions. Other functional forms may also meet this criteria.

The first example of an improved Nyquist filter has a frequency domain defined by a composite sine function. In particular, the frequency characteristic of this preferred filter is provided by the following equations:

$$NF = T, \text{ when } |\omega| \leq \frac{\pi}{T}(1-\alpha)$$

$$NF = \frac{T}{2}\left(1 - \sin\left(\frac{\pi}{2}\sin\left[\frac{T}{2\alpha}\left(|\omega| - \frac{\pi}{T}\right)\right]\right)\right), \text{ when } \frac{\pi}{T}(1-\alpha) \leq |\omega| \leq \frac{\pi}{T}(1+\alpha)$$

$$NF = 0, \text{ when } \frac{\pi}{T}(1+\alpha) \leq |\omega|$$

The square root of the frequency domain is given by the following equations.

$$\sqrt{NF} = \sqrt{T}, \text{ when } |\omega| \le \frac{\pi}{T}(1-\alpha)$$

$$\sqrt{NF} = \sqrt{\frac{T}{2}\left(1 - \sin\left\{\frac{\pi}{2}\sin\left[\frac{T}{2\alpha}\left(|\omega| - \frac{\pi}{T}\right)\right]\right\}\right)^{1/2}},$$

$$\text{when } \frac{\pi}{T}(1-\alpha) \le |\omega| \le \frac{\pi}{T}(1+\alpha)$$

$$\sqrt{NF} = 0, \text{ when } \frac{\pi}{T}(1+\alpha) \le |\omega|$$

This equation was derived by starting with the raised cosine frequency domain function and taking π/2 times the sine term of that raised cosine function as the argument of a second sine function. Accordingly, the frequency characteristic is a composite function since it includes a sine of a sine. This modification was made because when the square root version is differentiated, the frequency domain function is smooth at the stop bands. This function is continuous in the frequency domain up to and including the first derivative since the function and the first derivative of the function are continuous.

The time response can be derived by inverting the frequency function. This is done by taking the theoretical Fourier transform of the frequency function and leads to the following response:

$$nf(t) = \frac{1}{\pi}\Bigg(\pi\,\text{sinc}\left(\frac{t}{T}\right)\cos\left(\frac{\pi\alpha t}{T}\right) +$$

$$2(2\alpha)^2\left(\frac{t}{T}\right)\sin\left(\frac{\pi t}{T}\right)\cos\left(\frac{\pi\alpha t}{T}\right)\sum_{m=1}^{\infty}(-1)^{m+1}J_{2m-1}\left(\frac{\pi}{2}\right)$$

$$\left[\frac{1}{(2m-1)^2 - \left(\frac{2\alpha t}{T}\right)^2}\right]\Bigg)$$

The impulse response of the square root Nyquist filter can be expressed as $$nf-sqrt(t) = \frac{1-\alpha}{\sqrt{T}}\left(1 - \frac{\sqrt{2}}{2}J_0\left(\frac{\pi}{4}\right)\right)\text{sinc}\left(\frac{t}{T}(1-\alpha)\right) +$$

$$\frac{\sqrt{2}}{2\sqrt{T}}J_0\left(\frac{\pi}{4}\right)(1+\alpha)\text{sinc}\left(\frac{t}{T}(1+\alpha)\right) +$$

$$\frac{(2\alpha)^2 2\sqrt{2}}{\pi\sqrt{T}}\left(\frac{t}{T}\right)\sin\left(\frac{\pi t}{T}\right)\cos\left(\frac{\pi\alpha t}{T}\right)\sum_{m=1}^{\infty}(-1)^{m+1}\frac{J_{2m-1}\left(\frac{\pi}{4}\right)}{\left[(2m-1)^2 - \left(\frac{2\alpha t}{T}\right)^2\right]} +$$

$$\frac{\alpha^2 2\sqrt{2}}{\sqrt{T}\pi}\left(\frac{t}{T}\right)\cos\left(\frac{\pi t}{T}\right)\sin\left(\frac{\pi\alpha t}{T}\right)\sum_{m=1}^{\infty}(-1)^{m+1}\frac{J_{2m}\left(\frac{\pi}{4}\right)}{\left[m^2 - \left(\frac{\alpha t}{T}\right)^2\right]}$$

It is noted that mathematically inverting the frequency domain function leads to an infinite number of terms. This is not a problem, however, since the higher order terms decrease rapidly. In effect, the waveform can be calculated using only the first few terms.

As can be seen from the above equation, the impulse response includes Bessel functions J(x). In a digital computing system, these functions can be derived in the same manner as any other function, such as a sine. As a result, the present invention is no more difficult to implement than any other filter.

In the preferred embodiment, the Nyquist filter is implemented as a digital filter. Accordingly, the impulse response equation can be calculated once and the results stored in a lookup table. As a result, the fact that the equation is computationally complex is not a detriment. Since the equation is solved off-line, there is little negative impact if the computation is time consuming. Of course, this fact does not prevent the impulse response from being calculated in real-time if a system was so designed.

Figure 5:
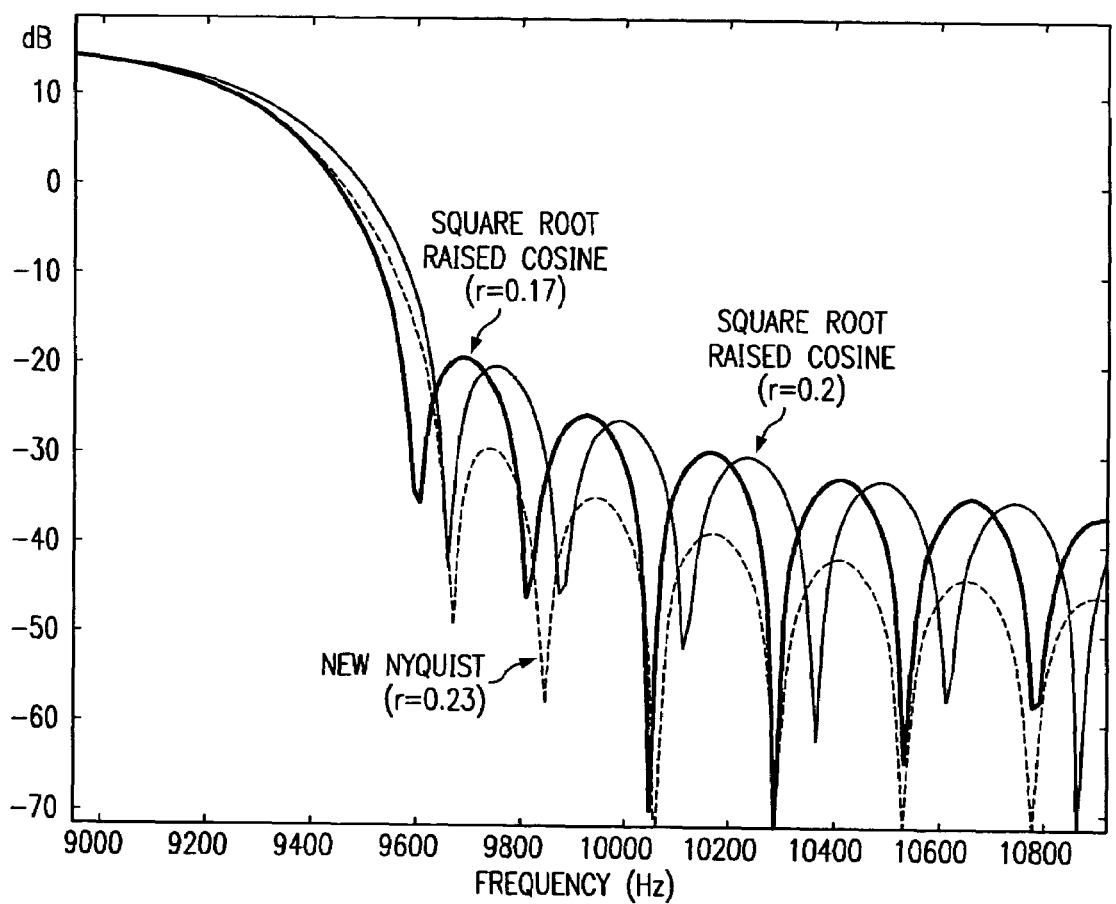
FIG. 5 is a plot comparing the frequency response of a known raised cosine filter with a preferred embodiment Nyquist filter of the present invention.

The performance characteristic of the first embodiment filter is illustrated in FIG. 5 along with curves from a square root raised cosine filter where α=0.17 and α=0.2. Each of these curves are taken in the square root version. These curves were taken from simulations of a system as described in co-pending application Ser. No. 09/295,660, now U.S. Pat. No. 6,252,910. In that system, a roll-off factor α=0.17 was found to be optimal for a raised cosine filter. As demonstrated by FIG. 5, the performance of the new Nyquist filter is improved at the stop bands, i.e., outside the ideal bandwidth of the channel. As shown in the figure, the filter of the present invention has 10 dB lower transmissions at the stop band when truncated to eight symbol periods. This represents a significant improvement.

Improved stop band performance is beneficial in a communication system since it allows signals on adjacent frequency channels to be more compactly fit into the frequency spectrum. It also makes it easier to meet the emissions mask requirements for a given channel. These mask requirements are generally dictated by a regulatory authority, such as the Federal Communications Commission in the United States, and define the level of signal that can be allowed outside a given channel.

In addition this filter eventually has lower amplitude ringing in the tails than a raised cosine filter. The new class of filters are characterized in the time domain by the tails damping faster than the equivalent raised cosine filter tails. After a given time delay in the impulse response, the new Nyquist filters ring at a lower amplitude and continue to ring at a lower amplitude than the equivalent raised cosine filter at all longer times to infinity.

Figure 6A:
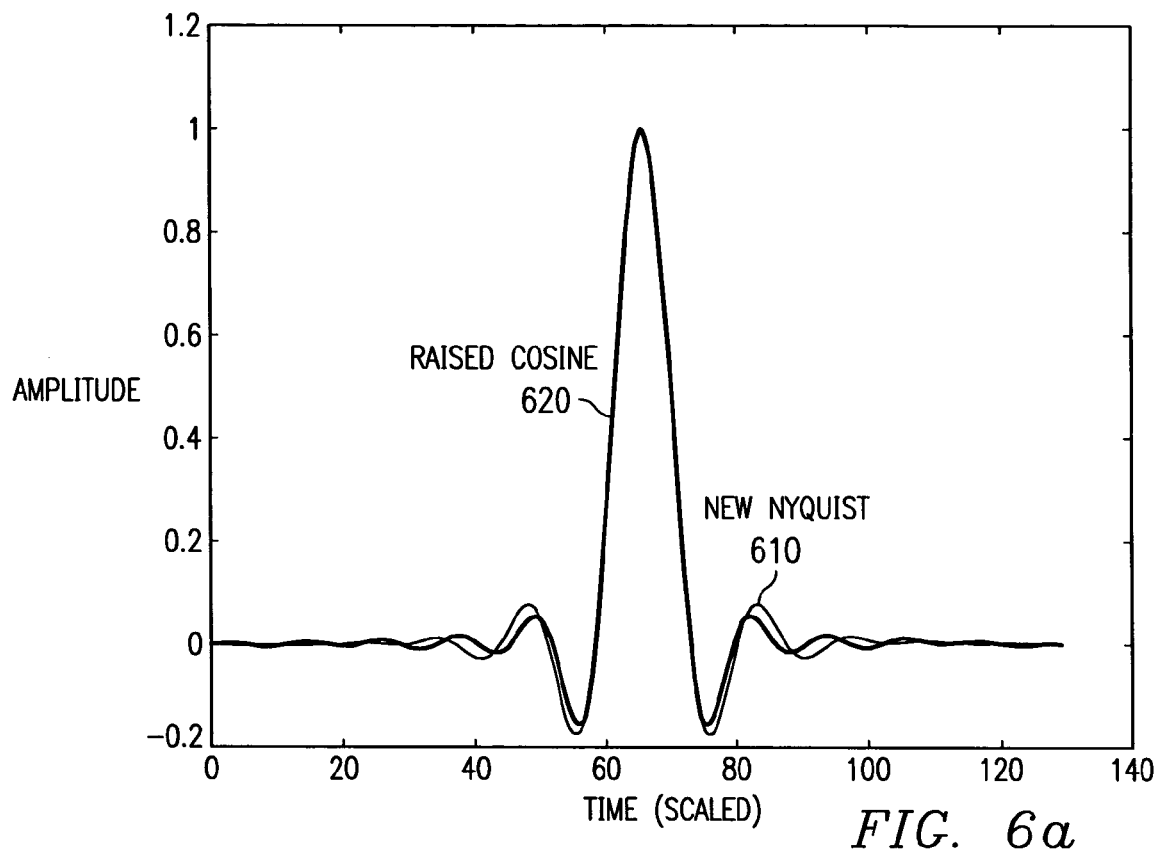
FIGS. 6a and 6b are an impulse response of a filter of the present invention.
Figure 6B:
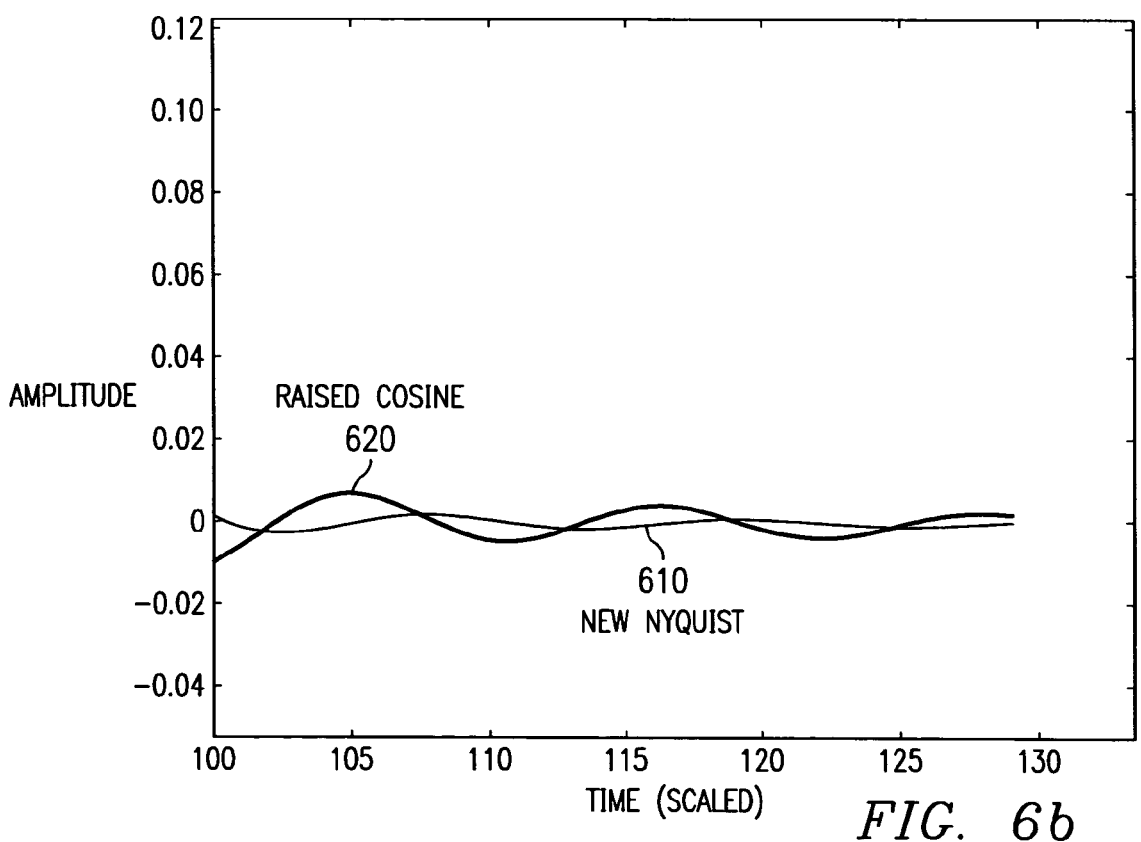

FIGS. 6a and 6b illustrate an exemplary impulse response for the new Nyquist filter (curve 610) and a known raised cosine filter. Referring to FIG. 6b in particular, the new Nyquist filter exhibits much lower amplitude levels at times farther from the peak. Because of these lower amplitudes, less energy is lost by truncation and therefore truncation will have a smaller affect on the frequency domain (and thus the stop band improvement shown in FIG. 5). In the filter of the preferred embodiment, the time domain is truncated after eight symbol-time delays, e.g., after 8T where T is the symbol rate.

A second embodiment filter of the present invention will now be described. This filter exhibits each of the characteristics of the first embodiment filter. That is, the filter meets the Nyquist criteria and, in the square root version, is continuous for all values of the first derivative. In addition, this filter is also continuous for all values of higher order derivatives as well.

The frequency domain and square root frequency domain equations for the second embodiment filter can be expressed with the following equations:

$$N(\omega) = \begin{cases} T, \text{ when } |\omega| \leq \frac{\pi}{T}(1-\alpha) \\ \frac{T}{2}\left(1 - \sin\left\{\frac{\pi}{2}\sin\left[\frac{\pi}{2}\sin\left(\frac{T}{2\alpha}\left(|\omega| - \frac{\pi}{T}\right)\right)\right]\right\}\right), \\ \quad \text{when } \frac{\pi}{T}(1-\alpha) < |\omega| < \frac{\pi}{T}(1+\alpha) \\ 0, \text{ when } \frac{\pi}{T}(1+\alpha) \leq |\omega| \end{cases}$$

$$N_{Sqrt}(\omega) = \begin{cases} \sqrt{T}, \text{ when } |\omega| \leq \frac{\pi}{T}(1-\alpha) \\ \sqrt{\frac{T}{2}\left(1 - \sin\left\{\frac{\pi}{2}\sin\left[\frac{\pi}{2}\sin\left(\frac{T}{2\alpha}\left(|\omega| - \frac{\pi}{T}\right)\right)\right]\right\}\right)^{1/2}}, \\ \quad \text{when } \frac{\pi}{T}(1-\alpha) < |\omega| < \frac{\pi}{T}(1+\alpha) \\ 0, \text{ when } \frac{\pi}{T}(1+\alpha) \leq |\omega| \end{cases}$$

Figure 6C:
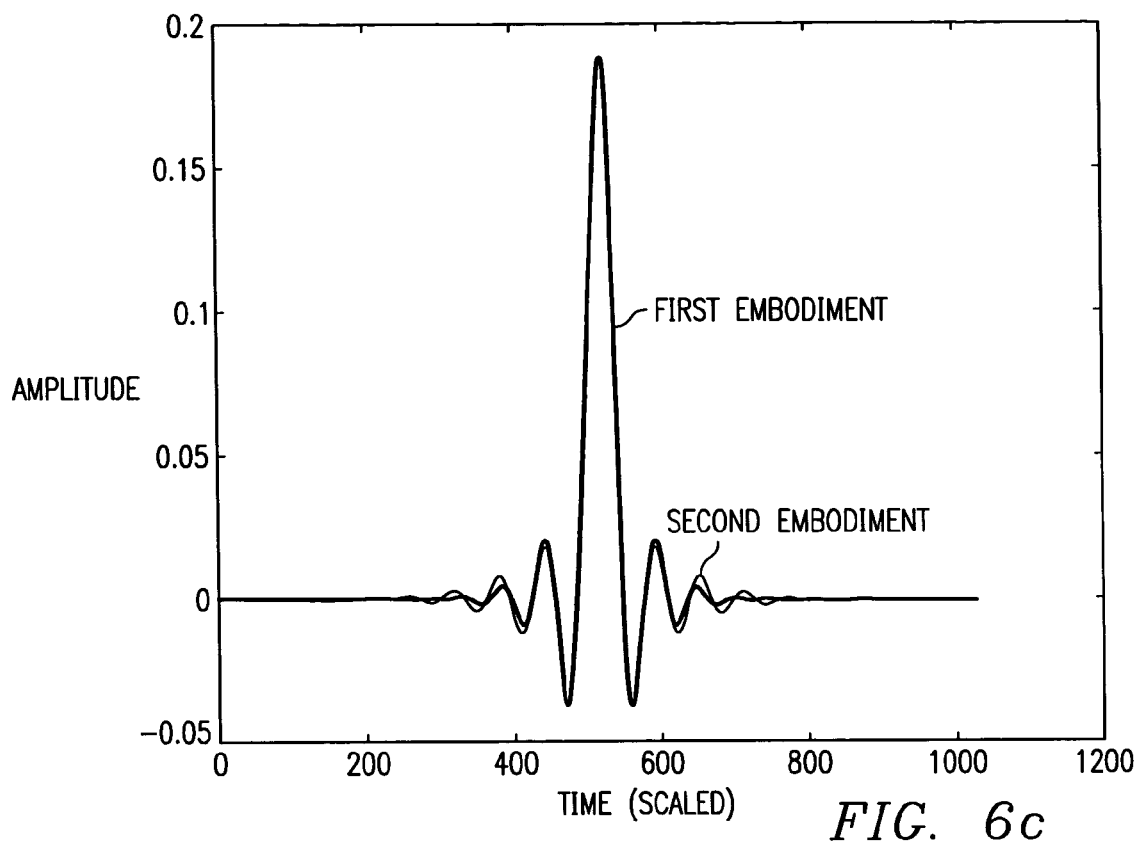
FIGS. 6c and 6d compare impulse response for two embodiment filters of the present invention.
Figure 6D:
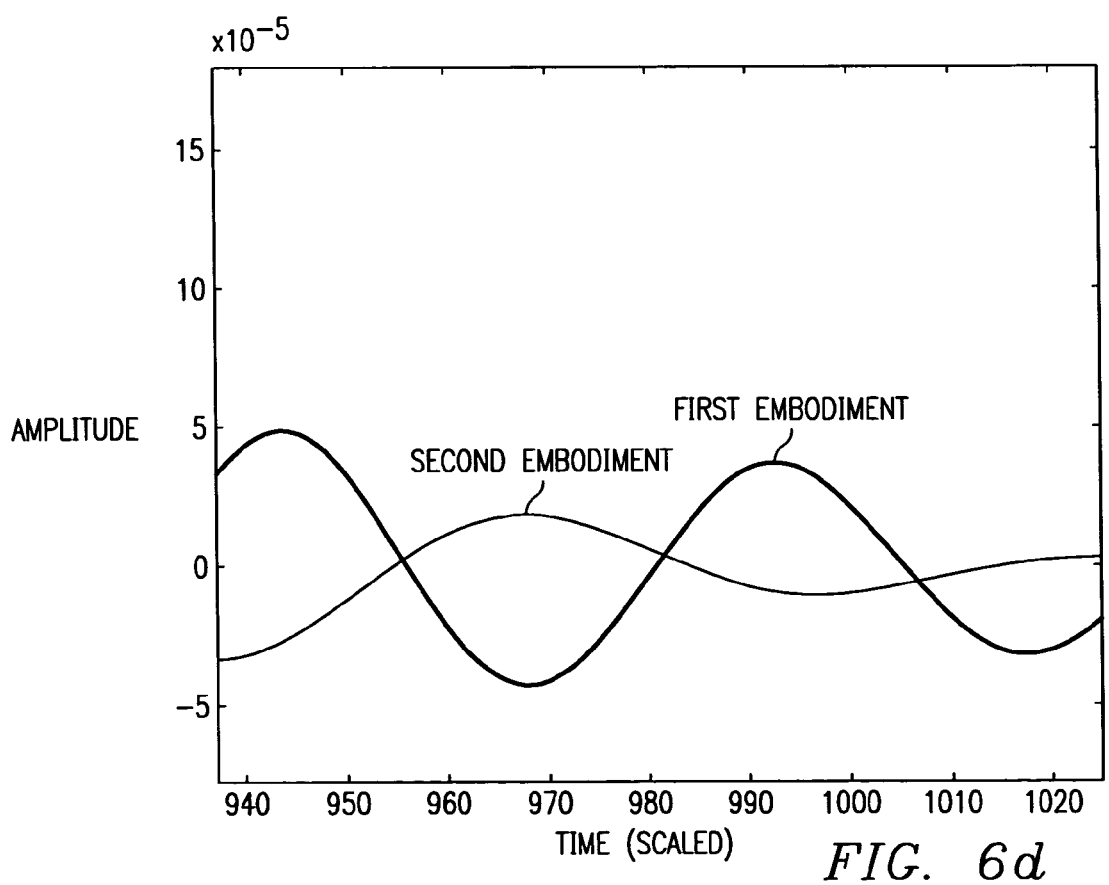

Inversions of the square root filters for the first and second embodiments are shown in FIG. 6c (and FIG. 6d, which focuses on the tails). The second embodiment inversion was performed numerically. Both filters have the same theoretical stop band. The second embodiment exhibits the same behavior with respect to the first embodiment as the first embodiment does with respect to the raised cosine filter. As shown in the figure, the first embodiment rings less at the beginning than the second embodiment. As shown in FIG. 6d, however, the second embodiment damps out more quickly giving less energy in the tails. The second embodiment transitions more smoothly to the stop band than the first embodiment.

Two examples of filters that meet the criteria for the new class of Nyquist filters have been described. Other functional forms may also meet the criteria of continuous derivatives and can be considered for this type of filters. These expressions might include hyperbolic sines and cosines, polynomials, and elliptic functions.

Alternatives to the preferred embodiments also include linear combinations of terms in the transition band. For example, a filter could be derived by adding the frequency domain response of the first embodiment described above with the frequency domain response of the second embodiment described above. These two (or more) functions could be weighted evenly or not. The terms could each include a differing number of sine terms in the combinations. Filters with transitional region (region II in FIG. 4) terms like $$\frac{T}{2}\left(1 - \frac{1}{\sin(a)}\left(\sin\left[a\sin\frac{\pi}{2}\sin\left(\frac{T}{2\alpha}\left(|\omega| - \frac{\pi}{T}\right)\right)\right]\right)\right)$$

and square root versions of the same, where a is to be determined, and linear combinations of these terms, can be fashioned to meet Nyquist's criteria.

Filters as described herein can be used in a variety of applications. For example, the filters can be used in any system that utilizes pulse shaping filters. Digital communication systems provide one such example. For example, filters of the present invention could be used in wireless communications (cellular, GSM, microwave, satellite), wired communications (in telephone systems, cable modems), optical systems, broadcast systems (digital television/radio, satellite), and others.

One example of a system that can utilize a filter of the present invention is described in co-pending application Ser. No. 09/295,660, now U.S. Pat. No. 6,252,910, which is incorporated herein by reference as if reproduced in its entirety. A Nyquist filter of the present invention can be used in place of each Nyquist filter included in that system. This system will now be described with respect to FIGS. 7-9.

FIG. 7 illustrates an exemplary radio system 700. System 700 could be a cellular telephone system, a two-way radio dispatch system, a localized wireless telephone or radio system or the like. Base unit 702 can communicate over transmission medium 704 to one or more terminal units 706. Transmission medium 704 represents the wireless communication spectrum. Terminal units 706 can be mobile units, portable units, or fixed location units and can be one way or two way devices. Although only one base unit is illustrated, the radio system 700 may have two or more base units, as well as interconnections to other communication systems, such as the public switched telephone network, an internet, and the like. In the preferred embodiment, the system provides for full duplex communications. The teachings of the present invention, however, apply equally to half duplex systems, simplex systems as well as to time division duplex and other two-way radio systems.

Figure 8A:
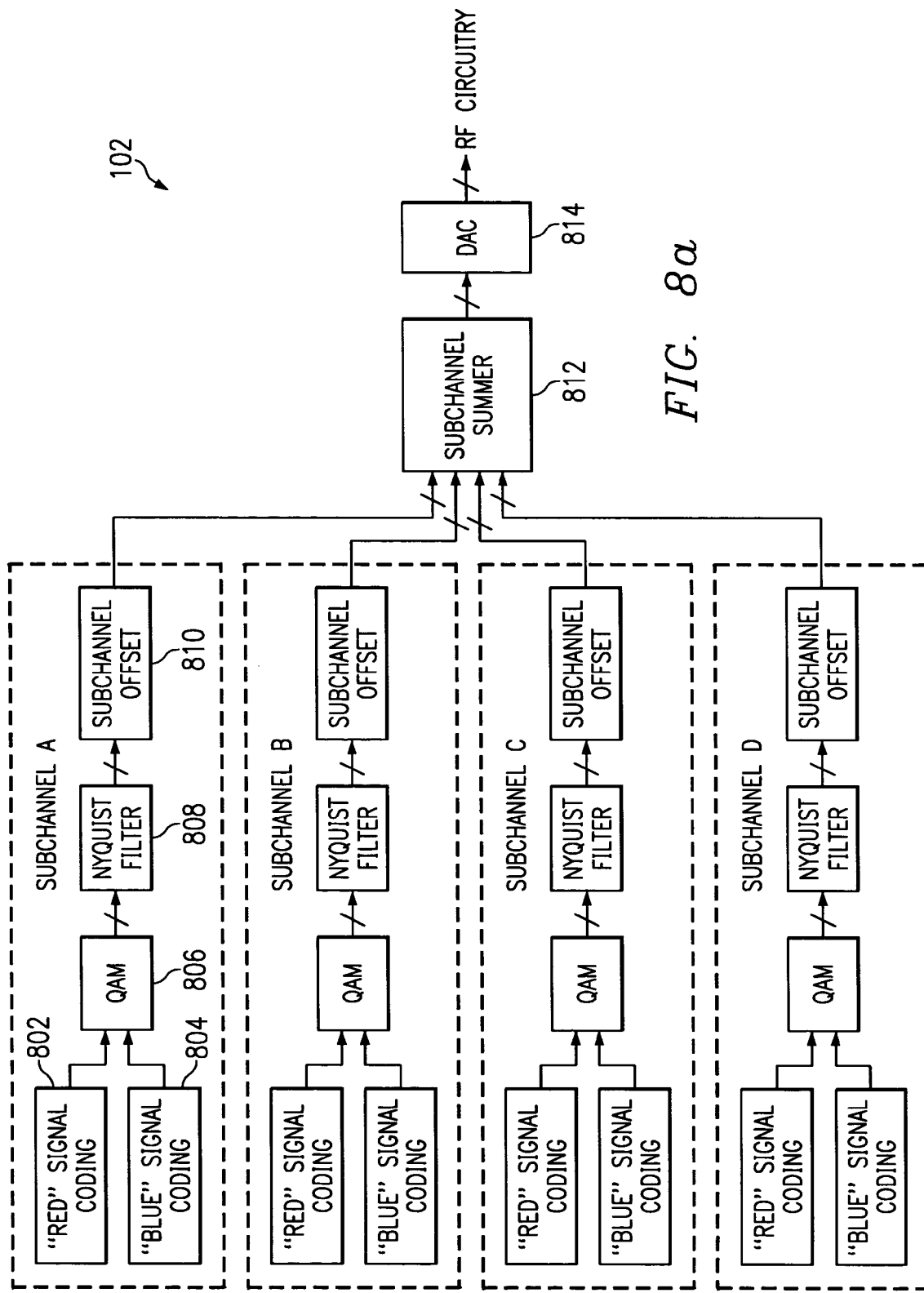

Details of preferred embodiments of the base unit and terminal units are provided in the following descriptions. FIGS. 8a through 8c provide block diagrams of several major components of an exemplary base unit 702. A skilled practitioner will note that several components of a typical radio transmitter/receiver not necessary to an understanding of the invention have been omitted. Note that many of the features and functions discussed below can be implemented in software running on a digital signal processor or microprocessor, or preferably a combination of the two.

FIG. 8a illustrates the four sub-channel architecture of a base unit 102 operating in transmitter mode. The following explanation will be addressed to sub-channel A, although the teachings apply to the other sub-channels as well. Sub-channel A includes "red" signal coding block 802 and "blue" signal coding block 804. The "red" and "blue" are arbitrary designations for the first and second time slots. Details regarding the signal coding blocks are provided in the co-pending application. For the present purpose, it is sufficient to state that the signal coding blocks receive voice and/or data signals, encode those signals if necessary, combine control signals, and prepare the combined signals for passage to QAM modulator 806.

Modulator 806 modulates the received signal using a quadrature amplitude modulation (QAM) architecture employing a 16 point constellation. With a sixteen point constellation, each symbol mapped to the constellation represents four bits. In the preferred embodiments, the signal is differentially encoded using a differential Gray code algorithm. Details of such architectures are well known in the art. See, for instance, Webb et al., Modern Quadrature Amplitude Modulation (IEEE Press 1994). Various other QAM techniques are known in the art, including Star QAM, Square QAM, and Coherent QAM. Additionally, other encoding techniques could be used, such as Okunev encoding or Khvorostenko encoding could be used in lieu of Gray coding. Other embodiments of the invention could include other modulation techniques as are known in the art, provided the modulation provides for sufficient data rate (16 kb/s in the preferred embodiments) with acceptable signal quality (i.e. signal to noise ratio) for the desired application.

The in-phase and quadrature-phase components of the QAM modulated signal (illustrated by the single line representing both signals, as indicated by the slash through each such signal path) are then passed to Nyquist filter 808 which provides a pulse shaping filter in order to limit the overall bandwidth of the transmitted signal. In the preferred embodiment, the Nyquist filter operates at a 65 times over-sampling rate, in order to simplify the analog filtering of digital images. Nyquist filter 808 may comprise any of the filters discussed in this specification.

Additionally, the signal is multiplied in sub-channel offset block 810 by the offset required for the sub-channel upon which the signal is to be transmitted. In the preferred embodiment, the offset for sub-channel A would be minus 7.2 kHz, for sub-channel B would be minus 2.4 kHz, for sub-channel C would be plus 2.4 kHz, and for sub-channel D would be plus 7.2 kHz.

The QAM modulated and filtered signal A is then combined with the modulated and filtered signals from sub-channels B, C, and D in sub-channel summer 812 before being passed to digital-to-analog converter 814 where the combined signals are converted to an analog signal. The signal is then passed to radio frequency circuitry (not shown) where the signal is modulated to RF and amplified for transmission, as is known in the art.

In the preferred embodiment, the system is implemented using a digital signal processor. In this embodiment, all of the circuitry in the box labeled "Subchannel A" (as well as the other subchannels) and the subchannel summer 812 are implemented by a single chip. In fact, this chip can be designed to handle analog signals at both the input and the output by integrating an analog-to-digital converter (not shown) and digital-to-analog converter 814 on chip. Alternatively, the functions can be distributed amongst a number of interconnected integrated circuit chips.

In the preferred embodiment, the impulse response of filter 808 would be calculated once and stored in a lookup table, for example a EEPROM on a digital signal processor chip. The filter can then be implemented in the same manner as any other finite impulse response (FIR) filter, as is known in the art.

FIGS. 8b and 8c illustrate base unit 102 operating in receiver mode. FIG. 8b provides a high level block diagram of the four sub-channel architecture. Signals from the terminal units are received by radio frequency (RF) receiving circuitry (not shown). A/D converter 840 receives the signal from the RF receiving circuitry and converts it to a digital signal, which is fed to each of the four sub-channel paths, 844, 845, 846, and 847.

FIG. 8c illustrates the details of sub-channel A, 844 of FIG. 8b. Note that these teachings apply equally to sub-channels B, C, and D, 845, 846, and 847, respectively. In complex multiplier 850, the frequency offset corresponding to the particular sub-channel (+/−2.4 kHz or +/−7.2 kHz) is removed from the incoming signal. The signal is then frequency channelized by the square root Nyquist matched filter 852. Once again, matched filter 852 may be any one of the filters discussed herein.

The filtered signal is passed to Symbol Synchronization block 854, which calculates the proper sampling point where there exists no (or minimal) inter-symbol interference signal. This is accomplished by calculating the magnitude of the sample points over time and selecting the highest energy points (corresponding to the synchronized symbol sample points). Magnitude tracking (block 858) is performed in order to remove channel effects from the differential decoder by determining if a detected change in amplitude of the signal is based on the intended signal information or on fading of the signal caused by interference. Based upon this determination, the threshold by which an incoming pulse is considered to be on the outer or inner ring of the QAM constellation (logically a "1" or a "0") is modified to adapt to the changing incoming signal quality.

Based upon the information provided by magnitude tracker 858, the likelihood that a bit is in error is calculated in fade finder block 859. Bits determined to be a high risk of being in error are marked as "at-risk" bits in block 861. The "at-risk" bit information is fed forward to the appropriate one of red or blue signal decoding blocks 866 and 868 and is used by the decoding blocks'error correcting processes. Symbol synch block 854 also feeds phase tracker 860, which is discussed below.

The modulated signal is fed from magnitude tracker 858 to QAM modulator/demodulator 864, wherein the signal is de-modulated to the base band signal before being passed to the appropriate one of red or blue signal decoding paths. Note that only one functional block is shown in FIG. 8c for each element of the path from Nyquist filter 852 to the red/blue decoding blocks. In practice, however two duplicate paths exist, one each for the red and blue signals. As a consequence Red/Blue multiplexer 863 is provided in the feedback path between Automatic Frequency Control block 862 and complex multiplier 850. This is because a different frequency correction factor will be determined for the incoming red and blue signals. The appropriate correction factor must be fed back to the complex multiplier when the desired signal (red or blue) is being received. Frequency control is provided in phase tracker 860 and AFC block 862.

Figure 9A:
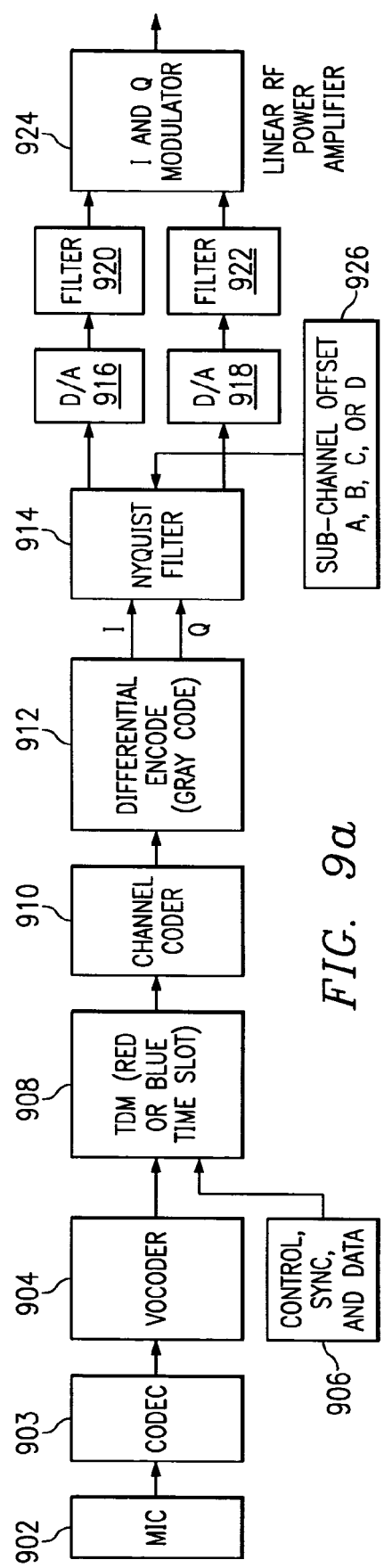
FIGS. 9a-9b show an exemplary terminal unit of the system of FIG. 7.
Figure 9B:
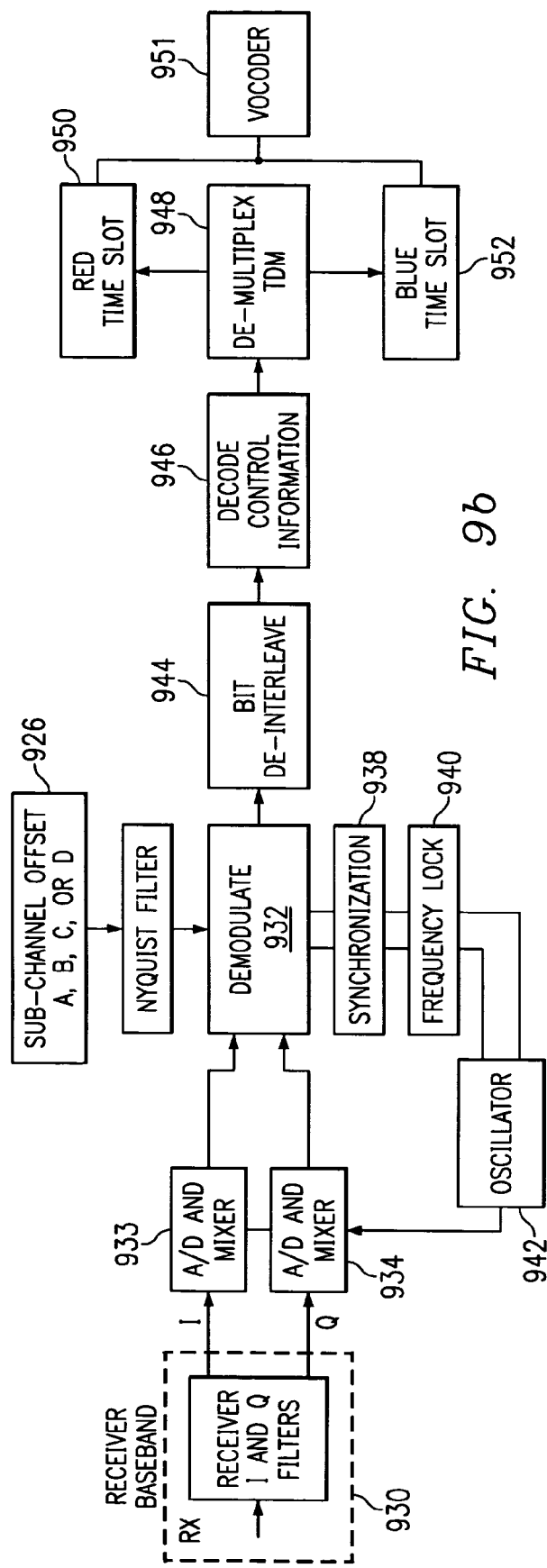

Details of the terminal unit are provided in FIGS. 9a and 9b. As noted above, the following discussion provides additional details and is relevant to the description of the base unit as both units use similar schemes for voice coding, signal processing, and modulation. FIG. 9a illustrates in block diagram form the terminal unit acting as a transmitter. The end users audio input is received at microphone 902 and passed to vocoder 904 via codec 903. Vocoder 904 provides for coding, compression, and forward error correction functions, as discussed above with reference to FIG. 8b. The signal is then passed to TDM formatter 908 along with control and synchronization bits from block 906 as well. The combined signals from vocoder 904 and control and synch block 906 are up-converted in TDM formatter block 908 to double the data rate. The signal is then passed to channel coder 910, where control and sync information is added to the signal and the bits are interleaved in order to make the transmitted signal less susceptible to noise, as is well known in the art.

The signal is modulated using QAM modulation (as described above) in block 912, as described above with reference to FIGS. 8a through 8c

The in-phase and quadrature-phase components of the QAM modulated signal are then passed to Nyquist filter 914 which provides a pulse shaping filter in order to limit the overall bandwidth of the transmitted signal. In the preferred embodiment terminal unit, the Nyquist filter operates at a 65 times over-sampling rate, in order to simplify the analog filtering of the digital image. The Nyquist filter 914 can be any of the filters discussed herein and will be matched with the corresponding filter from the base unit.

After passing through the Nyquist filter 914, the signal is multiplied by the frequency offset required for the sub-channel upon which the signal is to be transmitted. The offset signal is supplied by sub-channel offset block 926, which selects the sub-channel offset based upon instructions received from the base unit or upon pre-programmed instructions contained within the terminal unit's non-volatile memory.

Note that only a single QAM modulator is required for the terminal unit. This is because the terminal unit will only transmit on one sub-channel at any give time, as opposed to the base unit, which broadcasts over all sub-channels simultaneously.

The in-phase signal is fed to D/A converter 916 and the quadrature component is fed to D/A converter 918 where the signals are converted to analog signals. Filters 920 and 922 filter out spectral images at the Nyquist rate. Finally, the signals are fed to I & Q modulator 924 where the signals are modulated to radio frequency before being passed to RF transmitting circuitry (not shown).

FIG. 9b illustrates the terminal unit functioning as a receiver. Signals from the base unit or another terminal unit are received by RF receiving circuitry 930 where the RF signal is down-converted and filtered before being passed to A/D converter and mixer 933 for the in-phase component and 934 for the quadrature-phase component. Also at this point, the frequency offset associated with sub-channel selection is removed from the signal components by mixing into the received signal a signal complementary to the offset signal. The complementary offset signal is determined by sub-channel frequency offset control information, as illustrated by block 926 and depends on the sub-channel upon which the terminal unit is receiving. The digital signals are passed to a matched square root Nyquist Filter (which comprises any of the embodiments described herein) and then demodulated to a real binary signal in demodulator 932. The digital binary signal is then de-coded in blocks 944 and 946 using Viterbi decoding. The signal is then de-multiplexed in the time domain, wherein the data rate is reduced from 16 kb/s to 8 kb/s before being converted to an analog audio signal and reproduced by a speaker or similar end-user interface (not shown), or in the case of data before being displayed on an end-user interface such as an LCD display. Note that only one time slot 950 or 952 will be active at any given time and will drive the end-user interface(s).

Continuous fine frequency control is also provided for as indicated by blocks 860 and 862 of FIG. 8c and block 940 of FIG. 9b. Slot and symbol synchronization is provided for in block 938.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication system comprising:
   a first communication device including:
      a digital signal source;
      a quadrature amplitude modulation unit operatively coupled to the digital signal source;
      a first pulse shaping filter operatively coupled to the quadrature amplitude modulation unit, wherein the first pulse shaping filter is such that the frequency domain response meets the Nyquist criteria and that the square root of the frequency domain response has a first derivative that is continuous at all points, the pulse shaping filter having an impulse response corresponding to the square root of the frequency domain response;
      a modulator operatively coupled to receive a signal from the pulse shaping filter; and
      a transmitter operatively coupled to the modulator; and
   a second communication device including
      a receiver;
      a demodulator operatively coupled to the receiver;
      a second pulse shaping filter, the second pulse shaping filter being matched to the first pulse shaping filter and being such that the frequency domain response meets the Nyquist criteria and that the square root of the frequency domain response has a first derivative that is continuous at all points, the second pulse shaping filter having an impulse response corresponding to the square root of the frequency domain response;
      a quadrature amplitude demodulation unit operatively coupled to the second pulse shaping filter; and
      a signal output operatively coupled to the quadrature amplitude demodulation unit.

2. The communication system of claim 1 wherein the first communication device is a base unit and the second communication device is a terminal unit.

3. The communication system of claim 1 wherein the transmitter is to broadcast signals at radio frequency.

4. The communication system of claim 1 wherein the frequency domain response $NF(\omega)$, is represented by the following equations:

$$NF(\omega) = T, \text{ when } |\omega| \leq \frac{\pi}{T}(1-\alpha)$$

$$NF(\omega) = \frac{T}{2}\left(1 - \sin\left\{\frac{\pi}{2}\sin\left[\frac{T}{2\alpha}\left(|\omega| - \frac{\pi}{T}\right)\right]\right\}\right),$$
$$\text{when } \frac{\pi}{T}(1-\alpha) \leq |\omega| \leq \frac{\pi}{T}(1+\alpha)$$

$$NF(\omega) = 0, \text{ when } \frac{\pi}{T}(1+\alpha) \leq |\omega|$$

wherein $\omega$ is frequency, T is a time period between symbols, and $\alpha$ is a roll-off factor.

5. The communication system of claim 1 wherein said digital signal source comprises an analog signal source operatively coupled to an analog-to-digital converter.

6. The communication system of claim 1 and further comprising:
   an analog signal source; and
   an analog-to-digital converter operatively coupled between the analog signal source and the quadrature amplitude modulation unit.

7. A digital communications receive unit comprising:
   a signal receiving unit to receive a transmitted signal; and
   a Nyquist filter operatively coupled to an output of the signal receiving unit, the filter having a characteristic of a square root of a Nyquist function in the frequency domain, the filter further being such that the square root of the frequency domain response has a first derivative that is continuous at all points,
   wherein an output of said Nyquist filter is to be used to recover information contained in said transmitted signal.

8. The digital communications receive unit of claim 7 wherein the square root frequency domain response, $\sqrt{NF(\omega)}$, is represented by the following equations:

$$\sqrt{NF(\omega)} = \sqrt{T}, \text{ when } |\omega| \leq \frac{\pi}{T}(1-\alpha)$$

$$\sqrt{NF(\omega)} = \sqrt{\frac{T}{2}\left(1 - \sin\left\{\frac{\pi}{2}\sin\left[\frac{T}{2\alpha}\left(|\omega| - \frac{\pi}{T}\right)\right]\right\}\right)^{\frac{1}{2}}},$$
$$\text{when } \frac{\pi}{T}(1-\alpha) \leq |\omega| \leq \frac{\pi}{T}(1+\alpha)$$

$$\sqrt{NF(\omega)} = 0, \text{ when } \frac{\pi}{T}(1+\alpha) \leq |\omega|,$$

wherein $\omega$ is frequency, T is a time period between symbols, and $\alpha$ is a roll-off factor.

9. The digital communications receive unit of claim 7 wherein the signal source comprises an analog-to-digital converter.

10. The digital communications receive unit of claim 7 wherein the signal receiving unit comprises a demodulator.

11. An integrated circuit comprising:
a memory device to store a look-up table for an impulse response for a filter, the filter having a characteristic of a square root of a Nyquist function in the frequency domain, the filter further being such that the square root of the frequency domain response has a first derivative that is continuous at all points; and
a digital signal processor operatively coupled to the memory device.

12. The integrated circuit of claim 11 wherein the square root frequency domain response, $\sqrt{NF(\omega)}$, is represented by the following equations:

$$\sqrt{NF(\omega)} = \sqrt{T}, \quad \text{when} |\omega| \leq \frac{\pi}{T}(1-\alpha)$$

$$\sqrt{NF(\omega)} = \sqrt{\frac{T}{2}\left(1 - \sin\left\{\frac{\pi}{2}\sin\left[\frac{T}{2\alpha}\left(|\omega| - \frac{\pi}{T}\right)\right]\right\}\right)^{\frac{1}{2}}},$$

$$\text{when } \frac{\pi}{T}(1-\alpha) \leq |\omega| \leq \frac{\pi}{T}(1+\alpha)$$

$$\sqrt{NF(\omega)} = 0, \text{ when } \frac{\pi}{T}(1+\alpha) \leq |\omega|,$$

wherein ω is frequency, T is a time period between symbols, and α is a roll-off factor.

13. A digital communications transmit unit comprising:
a signal source to provide an information-bearing signal; and
a Nyquist filter operatively coupled to an output of the signal source, the filter having a characteristic of a square root of a Nyquist function in the frequency domain, the filter further being such that the square root of the frequency domain response has a first derivative that is continuous at all points,
wherein an output of the Nyquist filter is to be provided for transmission over a communications channel.

14. The digital communications transmit unit of claim 13 wherein the square root frequency domain response, $\sqrt{NF(\omega)}$, is represented by the following equations:

$$\sqrt{NF(\omega)} = \sqrt{T}, \quad \text{when} |\omega| \leq \frac{\pi}{T}(1-\alpha)$$

$$\sqrt{NF(\omega)} = \sqrt{\frac{T}{2}\left(1 - \sin\left\{\frac{\pi}{2}\sin\left[\frac{T}{2\alpha}\left(|\omega| - \frac{\pi}{T}\right)\right]\right\}\right)^{\frac{1}{2}}},$$

$$\text{when } \frac{\pi}{T}(1-\alpha) \leq |\omega| \leq \frac{\pi}{T}(1+\alpha)$$

$$\sqrt{NF(\omega)} = 0, \text{ when } \frac{\pi}{T}(1+\alpha) \leq |\omega|,$$

wherein ω is frequency, T is a time period between symbols, and α is a roll-off factor.

15. The digital communications transmit unit of claim 13 wherein the signal source comprises an analog-to-digital converter.

16. The digital communications transmit unit of claim 13 wherein the signal source comprises a mapping unit.

* * * * *